United States Patent [19]
Schubert et al.

[11] Patent Number: 6,116,362
[45] Date of Patent: Sep. 12, 2000

[54] ARTICULATED VEHICLE

[75] Inventors: William Schubert, Downers Grove, Ill.; Geoffrey Schmitz, Nausau, Wis.

[73] Assignee: Case Corporation, Racine, Wis.

[21] Appl. No.: 09/112,586

[22] Filed: Jul. 9, 1998

[51] Int. Cl.[7] .................................................. B62D 55/00
[52] U.S. Cl. ........................................ 180/9.44; 180/9.46
[58] Field of Search .................................. 180/9.1, 9.44, 180/9.46; 305/116, 130, 131, 135

[56] References Cited

U.S. PATENT DOCUMENTS

| | | |
|---|---|---|
| 1,316,092 | 9/1919 | Grover et al. . |
| 2,383,754 | 8/1945 | Watt ........................................ 180/9.44 |
| 3,265,146 | 8/1966 | Tucker .................................... 180/9.44 |
| 3,435,908 | 3/1967 | Sunderlin et al. . |
| 3,451,494 | 6/1969 | Kowalik ................................. 180/9.44 |
| 3,789,942 | 2/1974 | Kowalik . |
| 3,869,010 | 3/1975 | Stedman . |
| 3,937,289 | 2/1976 | Dickinson .............................. 180/9.44 |
| 4,075,203 | 2/1978 | Pierson .................................. 180/9.44 |
| 4,453,611 | 6/1984 | Stacy, Jr. . |
| 4,579,182 | 4/1986 | Dewing et al. . |
| 4,966,242 | 10/1990 | Baillargeon . |
| 5,125,467 | 6/1992 | Mancheron ............................ 180/6.48 |
| 5,127,714 | 7/1992 | Satzler . |
| 5,325,933 | 7/1994 | Matsushita . |
| 5,533,587 | 7/1996 | Dow et al. . |
| 5,632,350 | 5/1997 | Gauvin . |

Primary Examiner—Eric Culbreth
Assistant Examiner—L. Lum
Attorney, Agent, or Firm—Mayer, Brown & Platt

[57] ABSTRACT

Articulated track supported land vehicles having both structure to effect major steering changes and minor steering changes wherein the minor changes are enabled by track warping mechanisms that utilize linear motors to selectively orient the direction of travel of track supporting wheels.

10 Claims, 4 Drawing Sheets

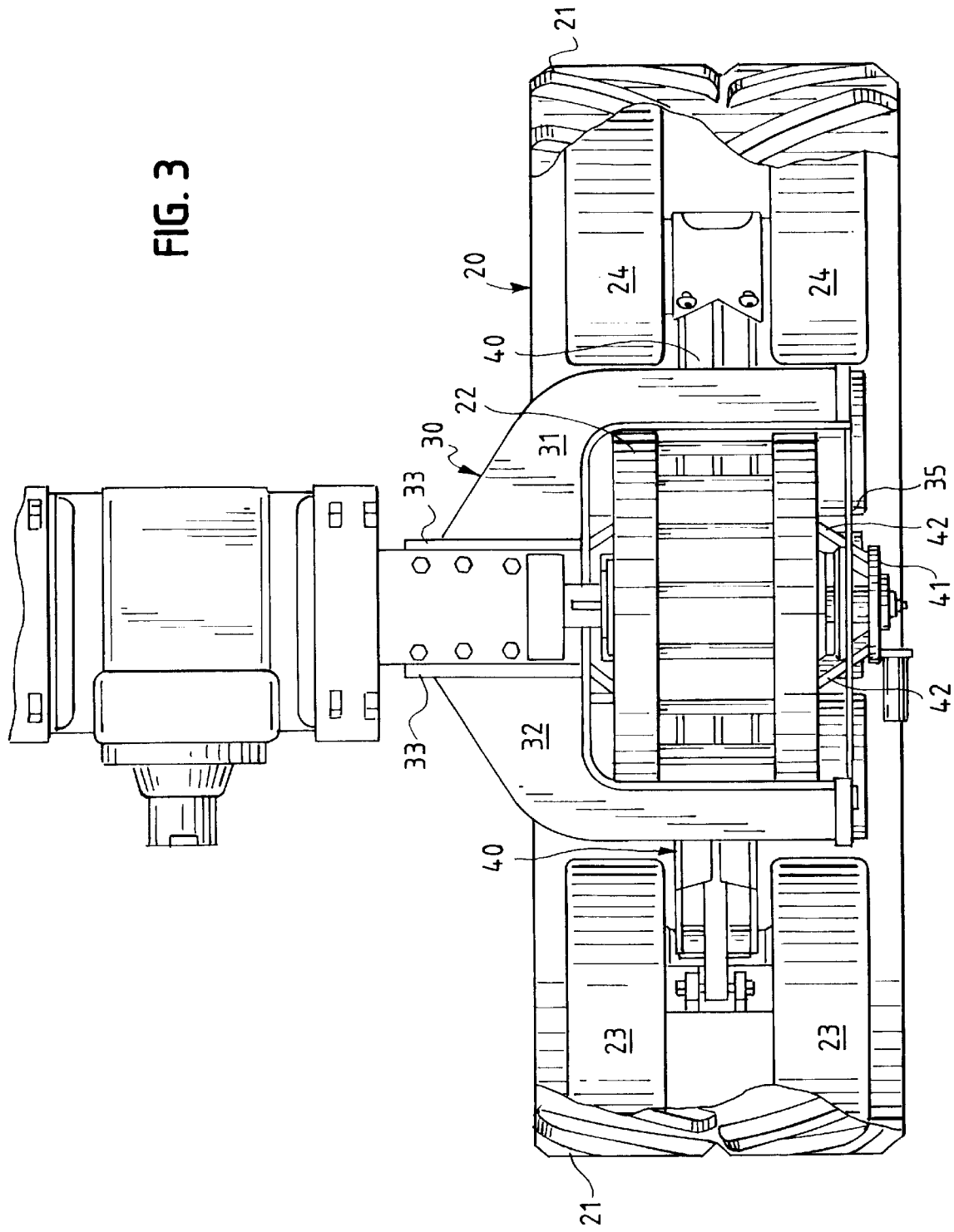

ARTICULATED VEHICLE

FIELD OF THE INVENTION

Work vehicles, such as agricultural tractors and the like are increasingly outfitted with undercarriage arrangements that utilize endless tracks for supporting and driving the equipment over the ground. The reduced load per unit area, compared to the more usual wheeled tractor, is effective in producing significantly lower levels of soil compaction. Typical vehicle undercarriages, whether for use in conjunction with either a steel track system or a rubber track system typically include a drive wheel and several idler and bogie wheels arranged such that their rotational axes are parallel and the wheels are aligned for containment within the encompassing track. In agricultural equipment in which a tractor is used in conjunction with an articulated tractor having a front and back part which together form the entire tractor, change in equipment direction has normally been effected by interconnecting the front and rear vehicle units with coupling members that can be expanded and contracted to alter the angular relationship between the center lines of the front and rear vehicle units. For example, in U.S. Pat. No. 3,435,908, issued Apr. 1, 1969 to D. E. Sunderlin, et al. there is shown an articulated crawler tractor construction in which steering of the tractor 10 is effected by a pair of double-acting linear hydraulic motors 27. The linear motors are connected between front and rear body sections 11 and 12, respectively, with one at each side of the articulated connection between the two body sections. Steering of the apparatus is effected simply by contracting one motor while expanding the other, thereby causing the front and rear units to basically go from a straight line to a jack-knife position.

Another form of steering which is known in the art is one that is referred to as "track warping" or "track snaking" which can be used to make minor steering corrections. Track warping, for example, could be used to make minor steering corrections for a tracked agricultural vehicle. The track warping concept has been known for some time, but has not been used in conjunction with articulated vehicles to provide steering allowing small adjustments in vehicle direction.

An early example of track warping to adjust the direction of a tracked vehicle can be seen by referring to U.S. Pat. No. 1,316,092, issued Sep. 16, 1919, and issued to R. Grover, et al. In this particular construction, an endless chain is deployed around sprocket wheels 1 and 2. As can be seen in FIG. 2, the construction is provided with an axle 20 for each wheel, a driving joint 21 and steering arms 28 whereby the direction of the drive wheels can be changed to alter or warp the direction in which the endless chain is moving. This type of construction requires the use of a multiplicity of steering parts which is disadvantageous in achieving long-term, low-maintenance operation of the equipment.

In the present invention the vehicle can be warped to effect steering of the articulated vehicle, depending to some extent on the users preference. In either case the mechanisms for achieving track warping are the same, regardless of which of the articulated pieces of equipment is involved. The type of track warping mechanism envisioned simplifies the equipment in that steering knuckles or other similar steering mechanisms can be eliminated.

The present invention provides a novel support/steering construction for use on a tractor which is comprised of front and rear articulated units. Each unit is supported on an endless track that is deployed around a drive wheel, and around one or more idler and bogie wheels. Each of the tracked structures is supported in a unique way from the body units so that warping of the entrained track can be effected to assist in the vehicle steering process. The drive wheel on the tracked supporting structure is operably connected to the front, tractor drive system so that it can, when desired, cause the endless track to be driven. Bearing support means are located on each side of the drive wheel and these bearing support means act as the means from which an idler and bogie wheel support beam is supported. Between the idler support beam and the vehicle body are bearing points and an operating structure that is connected to at least one track idler wheel in such a way that the operating means can change the orientation of the track on the body unit and thereby affect changes in the direction of travel of the vehicle. Track warping can be effected, as desired, on both the front and rear units to obtain a crab steering effect or a coordinated steering effect, as seen on vehicles having front and rear steerable axles.

BRIEF DESCRIPTIONS OF DRAWINGS

FIG. 3 is a top plan of one track drive and support mechanism with part of the track broken away;

FIG. 3a is a side sectional schematical view of the support mechanism.

DESCRIPTION OF THE PREFERRED EMBODIMENT

Figure 2:
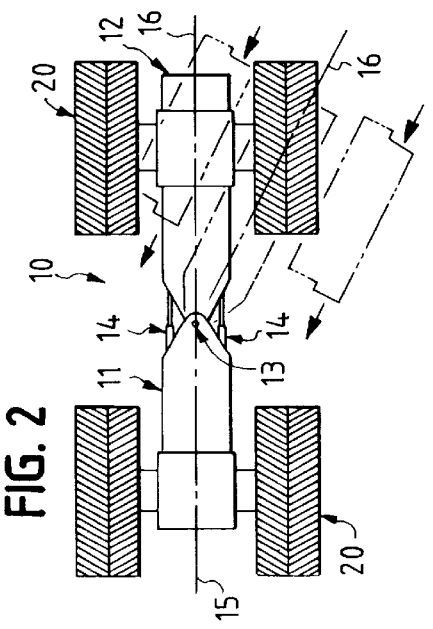
FIG. 2 is a schematic top elevation showing the two articulated vehicle units and the manner in which the longitudinal center line of one unit can be changed with respect to the other unit.
Figure 1:
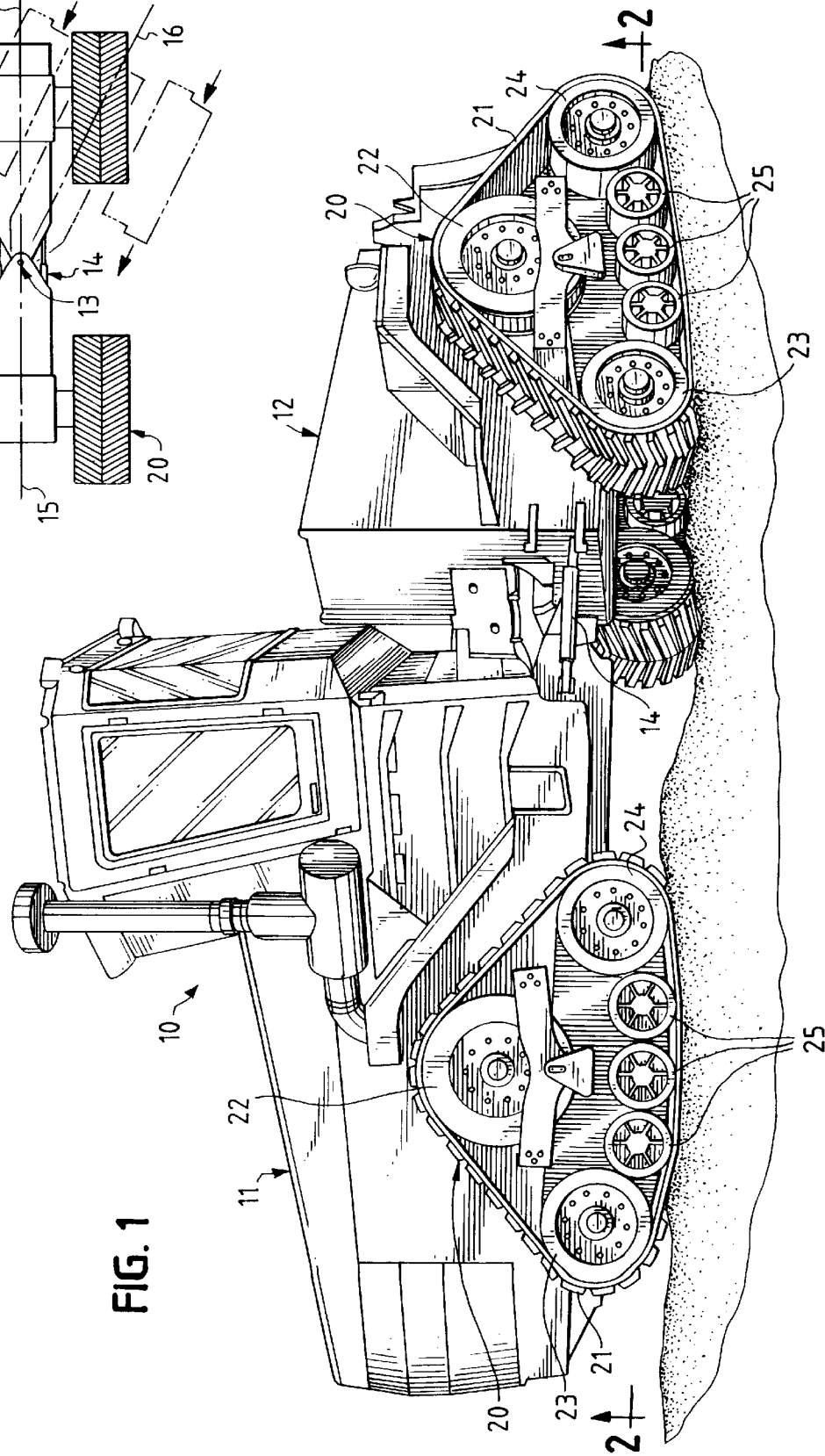
FIG. 1 is a perspective view of one type of articulated vehicle with which the present invention can be used.

Referring to FIG. 1, the numeral 10 indicates an articulated tracked vehicle of the type with which the present invention is concerned. It comprises a tractor which has a drive unit 11 and a trailer unit 12 which is coupled to the drive unit 11. Drive unit 11 contains the principal propulsion mode i.e., an internal combustion engine and is the source of the power for moving the tractor and any trailer units connected thereto. Drive unit 11 and trailer unit 12 are connected at an articulation point 13 (see FIG. 2) and by a pair of linear motors 14. Double acting hydraulic pistons can be used to exert the force required to cause a change in the alignment of the longitudinal center lines 15 and 16 of the drive and trailer units with respect to each other. The manner in which the orientation of the center lines of the two body units can be altered is indicated by the dashed lines shown in FIG. 2. Each of the body units 11 and 12 is supported on tracked drive and support means 20 that are located on each side of the respective body unit.

Each drive and support means 20 comprises an endless track 21 that is entrained about a drive wheel 22, a pair of idler wheels 23 and 24 which are located at the leading and trailing portions of track 2 1, as viewed with respect to the direction in which the track usually rotates when the vehicle is moving in a forward direction. Also included are a plurality of bogie wheels 25 that provide additional support for the tracked vehicle. By referring to FIG. 3, it can be seen that the tracked drive and support means 20 and specifically the drive wheel 22 is connected to the chassis or undercarriage of each vehicle unit by means of a yoke-like member 30. Yoke 30 is made up of two separate members 31 and 32, which on the inner end are attached to the frame of the vehicle by means of fastening plates 33 and at the outer ends of arms 31 and 32 are spanned by an undercarriage bearing support member 35 that extends parallel to the longitudinal axis of the body chassis.

The idler wheel 23, which is the foremost or leading of the two idler wheels in each tracked vehicle support system, and idler wheel 24 as well as bogie wheels 25 are all mounted for rotation on an undercarriage beam 40 which is located beneath yoke 30 and is dependent, through intermediate connecting apparatus, therefrom. By referring to FIG. 3a it can be seen that undercarriage beam 40 is dependent from bearing support 35 on the outer side and from the yoke 30 on the inner side by means of dependent connecting plates 41 and inwardly extending arms 42. Arms 42 extend inwardly from plates 41 on both the outer and inner sides. In order to provide flexibility so that the vehicle 10 can move over uneven ground, plates 41 are pivotally connected at the upper ends thereof to the undercarriage bearing support 35 and to the closed end of the yoke 30 by means of linkage that will permit swiveling of the undercarriage beam 40 about a horizontal axis. For example, the connection between plates 41 and bearing support 35 and yoke 30 can advantageously be a connection such as a swivel or ball joint 45 (see FIG. 6). It is essential that a swivel joint be located both at the inner and outer sides of yoke 30 when the tracking orientating adjustment mechanism shown in FIGS. 5 and 6 are used, as will be explained more fully below.

Figure 4:
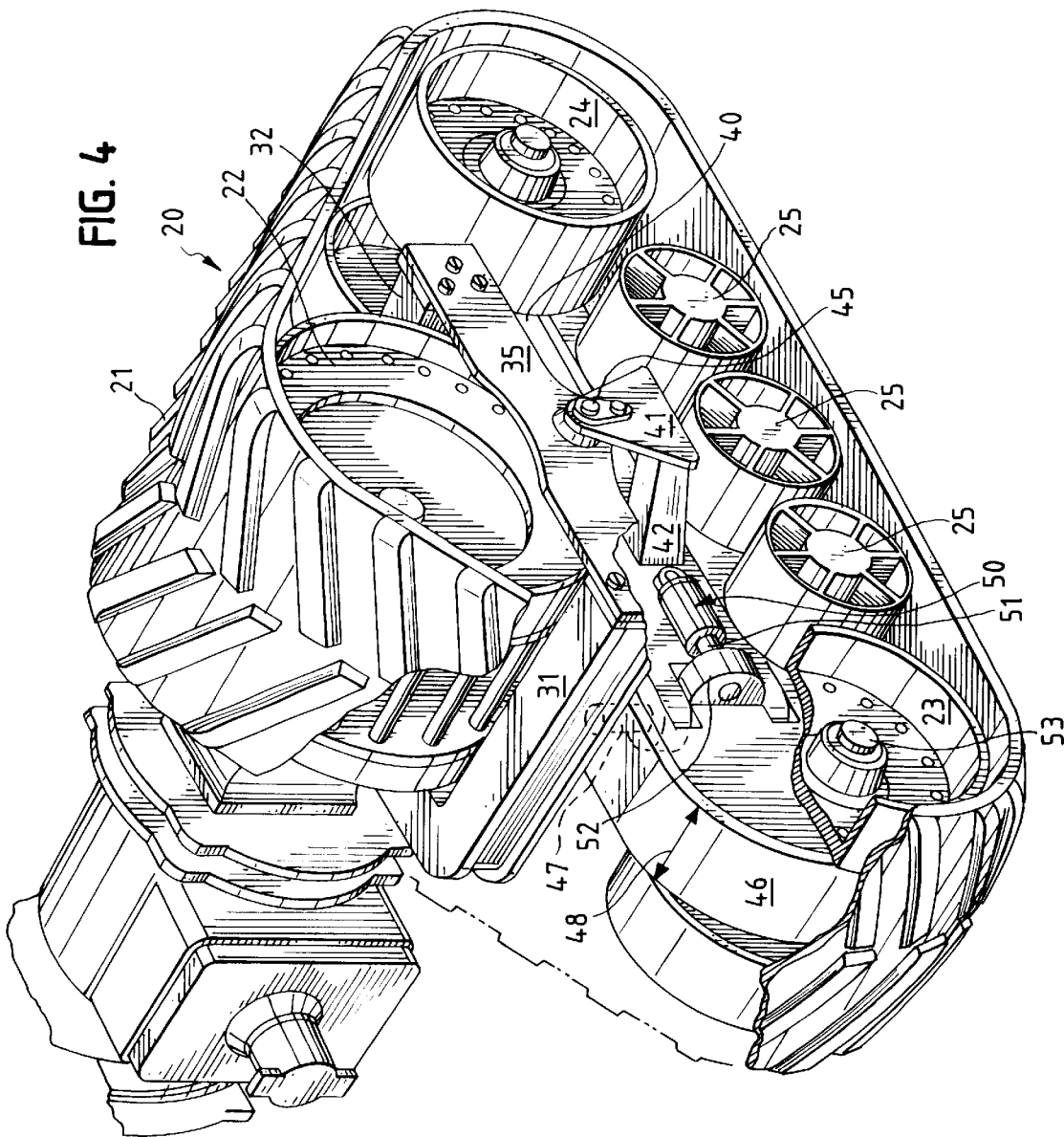
FIG. 4 is a perspective of one of the body unit endless track supports showing one means for adjusting the direction of travel of the track.

The present invention incorporates means for changing the orientation of track 21 to enable minor changes in the direction of travel of the vehicle. Major changes in direction are, of course, as mentioned before, effected by the linear motors 14. However, in order to maintain the direction of travel of the apparatus in the straight lines through a field, it is desirable to have a separate direction control means whereby accurate directional control can be achieved. FIG. 4 of the drawings illustrates one construction contemplated for making modifications in tractor direction by means of belt warping. In this modification the leading end of undercarriage beam 40 is provided with a yoke 46 that is mounted on an axis pin 47 so that the yoke 46 can pivot about the vertical axis as indicated by the arrow 48. Pivotal movement of yoke 46 about axis 47 can advantageously be effected by means of a piston and cylinder arrangement 50. The piston is connected to undercarriage beam 40 on the end opposite piston arrangement. The end of the piston rod 51 is connected to an ear 52 that extends outwardly from the side of yoke 46 so that reciprocation of the piston rod within the cylinder will effect oscillating movement of the yoke 46, once again as indicated by arrow 48. Since the leading idler wheels 23 are journaled about axle 53 which extends through yoke 46 pivoting of yoke 46 by piston and cylinder arrangement 50 causes, both of the idler wheels 23 to be turned accordingly. Such rotation of the idler wheel changes the stress exerted against the interior of belt 21 and thereby causes a minor change in the direction of travel of the tractor.

Figure 6:
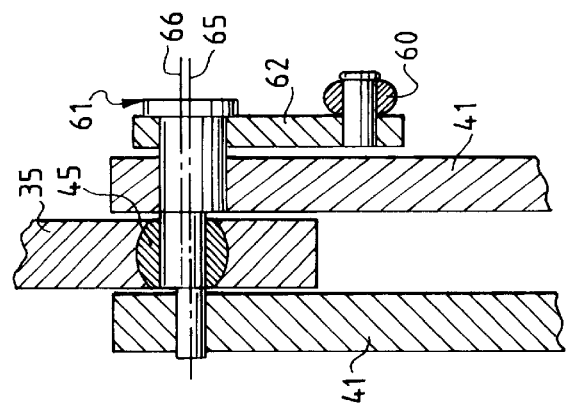
FIG. 6 is a sectional view along the line 6—6 of FIG. 5.
Figure 5:
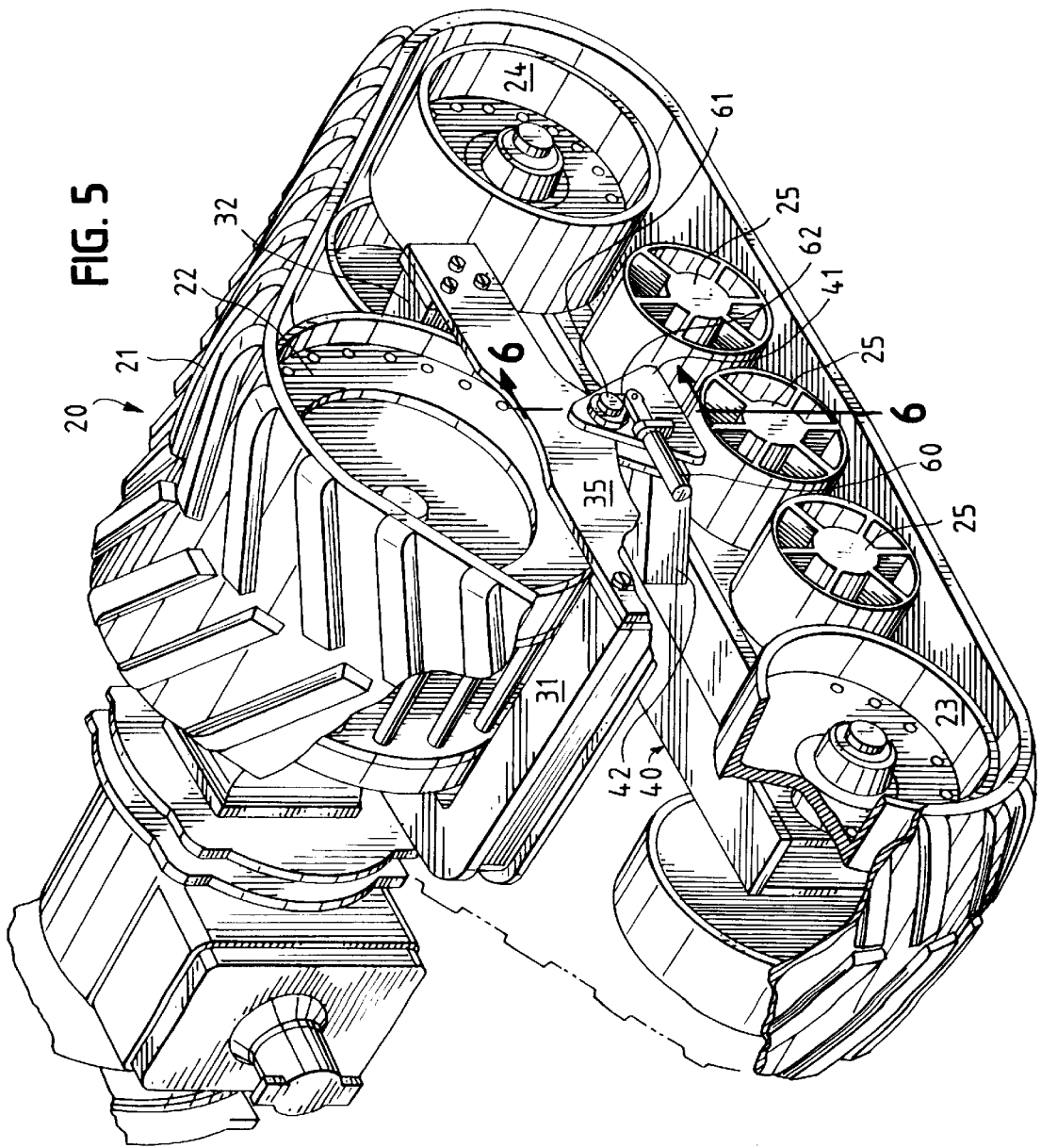
FIG. 5 is a view similar to that of FIG. 4 showing an alternative method for varying the orientation of the leading idler wheels to adjust the direction of travel of the endless track.

An alternative construction for enabling the adjustment of the idler and bogie wheels as an entire unit is shown in FIGS. 5 and 6 of the drawings. A bearing support point is provided on the inner side of yoke 30 and suitably dependent from it. Two pairs of plates 41 wherein each pair straddles the bearing support point and bearing support 35, respectively, are also provided. The plates 41 connected to the bearing support point and the bearing support 35 that face bearing beam 40 are connected to bearing beam 40 by a pair of inwardly extending arms 42 in the same manner as shown in FIG. 3. In this construction the steering means for altering the orientation of the idler wheels is comprised of a linear motor 60 that is secured onto the face of one of the plates 41 that are connected to bearing support 35. An eccentric shaft 61 with horizontal axis 65 extends through plates 41 that are connected to bearing support 35. The central portion of shaft 61 is contained within the ball socket 45 which has a horizontal axis 66. This shaft horizontal axis 65 is slightly offset from the ball socket horizontal axis 66. This permits not only movement about at least the horizontal axis, but linear movement in the horizontal direction of plates 41 that are attached to bearing support 35. The outer end of shaft 61 carries a lever arm 62 that is connected to motor 60 for arcuate movement to rotate the shaft 61. When it is desired to adjust the direction of the vehicle, motor 60 is operated to rotate shaft 61 and, depending upon the direction of rotation, plates 41 that are connected to the bearing support 35 are shifted slightly in a horizontal direction. This backward or forward movement of plates 41 that are connected to bearing support 35 causes the bearing beam 40 to pivot about the bearing support point on the inner side of the yoke 30 thereby changing the position of idler wheels 23. Other objects and advantages of this invention will be apparent from the description and appended claims and equivalent constructions will be suggested from a review of the disclosure and appended claims.

We claim:

1. An articulated tracked vehicle comprising:
   (a) a drive body unit and a trailer body unit, each unit having a longitudinal center line;
   (b) a plurality of tracked drive and vehicle support means each including a drive wheel and a plurality of idler wheels and an endless track entrained about the drive and idler wheels for supporting and moving the body units over ground;
   (c) a steering means operably connected between the drive and trailer body units to vary the orientation of the center line of each body unit with respect to the center line of the other body unit, whereby the direction of travel of the vehicle may be controlled; and
   (d) an operating means connected to at least one track idler wheel entrained within the track for changing the orientation of the track on at least one body unit to thereby effect changes in the direction of travel of the vehicle.

2. A tracked vehicle as defined in claim 1 wherein one of the idler wheels is located substantially at a forward most position of the vehicle track relative to the direction of travel of the vehicle.

3. A tracked vehicle as defined in claim 2 wherein the operating means includes a means to controllably vary the angular position of the horizontal axis about which at least the idler wheel in the forward most position rotates.

4. A tracked vehicle as defined in claim 3 which includes:
   (a) an idler wheel support beam pivotally attached to each of the body units and extending parallel to the body unit's longitudinal center line;
   (b) a plurality of idler wheels supportedly journaled on the support beam; and
   (c) wherein the operating means for changing track orientation is connected between the support beam and at least one of the idler wheels.

5. A tracked vehicle as defined in claim 4 wherein the operating means is a piston and cylinder.

6. A tracked vehicle as defined in claim 4 wherein the forward end of the support beam supports the forward most idler wheels and the forward end of the support beam is pivotable about a vertical axis.

7. A tracked vehicle as defined in claim 4 wherein the pivotal connection between the body unit and the support beam permits rotation of the support beam about a vertical axis.

8. A tracked vehicle, as defined in claim 7 wherein the pivotal connections comprise a ball joint.

9. An articulated tracked vehicle comprising:
   (a) a drive body unit and a trailer body unit, each unit having a longitudinal center line;
   (b) a steering means operably connected between the drive and trailer body units to vary the orientation of the center line of each body with respect to the centerline of the other body unit, whereby the direction of travel of the vehicle may be controlled;
   (c) an idler wheel support beam having a longitudinal center line pivotally attached to each of the body units and extending parallel to the body unit's longitudinal center line;
   (d) front and rear idler wheels supportedly journaled on the wheel support beam at opposite ends thereof; and
   (e) An operating means connected to the support beam and to one of the body units whereby the longitudinal center line of the support beam can be varied with respect to the center line of the body unit to which the support beam is attached to effect changes in the direction of travel of the vehicle.

10. A tracked vehicle, as defined in claim 8 wherein the operating means are linear motors.

* * * * *